Patented June 22, 1943

2,322,265

UNITED STATES PATENT OFFICE 2,322,265

YELLOW FLUORESCENT MATERIAL AND METHOD OF MAKING THE SAME

Woldemar A. Weyl, State College, Pa., assignor to American Optical Company, Southbridge, Mass., a voluntary association of Massachusetts No Drawing. Application January 2, 1941, Serial No. 372,891

10 Claims. (Cl. 250—81)

This invention relates to a new type of yellow fluorescing material and to the processes of producing the same.

A principal object of this invention is to produce a new material yielding a yellow fluorescent light.

Another object of the invention is to provide such a material which can be excited not only by cathode radiation and short wave ultra-violet, but also by near ultra-violet radiation.

Another object of the invention is to combine zinc and vanadium in such a way that the product yields a bright yellow fluorescence.

Another object of the invention is to simplify and to reduce the cost of manufacture of fluorescent materials of high efficiency by providing a substance which does not lose its fluorescence in the presence of minute traces of impurities.

Another object of the invention is to provide simple, efficient and economic processes for producing a fluorescent material of this nature.

Other objects and advantages of the invention will become apparent from the following description. It will be apparent that changes in the material and in the processes of making them may be made without departing from the invention as set forth in the accompanying claims. It is, therefore, not desired to limit the invention to the exact matters described as the preferred forms only have been set forth by way of illustration.

Yellow fluorescent materials have hitherto been prepared from zinc sulfide or from zinc silicates containing a suitable activator in each case. The first group has the disadvantage that it is very sensitive to chemical attack especially by metal vapors, particularly those metals that are commonly used as the source of ultra-violet radiation in cold light sources. The second group (silicates) have to be treated with cathode radiation or with very short wave length ultra-violet radiation in order to produce fluorescence.

I have discovered that a fluorescent material free from these objections can be obtained by suitable mixtures of ZnO and $V_2O_5$ (zinc oxide and vanadium pentoxide) after suitable heat treatment.

Starting from pure ZnO, no fluorescence is obtained. By mixing a source of zinc oxide with vanadium pentoxide or a suitable source of $V_2O_5$ such as ammonium vanadate, fluorescence appears as the amount of $V_2O_5$ increases from about five per cent $V_2O_5$ by weight and reaches a maximum intensity when the $V_2O_5$ content is about forty percent of the mixture. Further additions quench the fluorescence, and a mixture containing sixty percent of $V_2O_5$, forty percent ZnO exhibits no fluorescence at all.

After thorough mixing of the raw materials they must be heated to a preferred temperature. For example, a composition of three parts ZnO to two parts of $V_2O_5$ by weight when heated to below 600° C., even for a protracted time gives no noticeable fluorescence. Upon heating for only a few minutes to 780° C., however, a brilliant yellow fluorescence develops. The upper temperature limit for obtaining fluorescence is about 900° C.

The compound can also be obtained by precipitating solutions of zinc salts with ammonium vanadate and heating to the preferred temperature.

Another advantage of this substance is that traces of impurities such as iron, nickel, etc., which, as is well known, must be rigorously excluded in the preparation of the usual flourescent materials because they act to quench the fluorescence, do not hinder the fluorescence of zinc vanadates.

This material, I believe, is new and this procedure, I believe also is new as this result is unexpected as only sulphides show this fluorescence under long wave-length ultra-violet excitation.

The importance of this invention lies in the fact that at the present time there is no yellow fluorescent material and for this reason would make a commercially useful tube. At the present time to produce a yellow fluorescent it is necessary to use a yellow glass in combination with the fluorescent element.

This substance is preferably excited by relatively long wave lengths of the order of 3000 angstroms. This is unique as sulphides are generally considered to be classic examples of materials which can be excited by this relatively long ultra-violet wave length. Oxides and silicates in general are best excited by smaller wave lengths, for example by the 2537 A. wave length of a mercury lamp.

This material is important for use in the production of fluorescent lamps, signs, theatre lighting, state and auditorium, aircraft instruments and diagnostic instruments, etc.

As this material is excited by relatively long wave lengths it brings about new methods of application. For example, it could be applied outside the glass envelope enclosing the mercury. The glass would absorb the high intensity 2537 A. radiation, but would transmit the radiation above 3000 A. and this material will fluoresce even with 3600 A. radiation. By this means the fluorescing material is also shielded from attack by mercury vapor.

From the foregoing it will be seen that I have produced a new and novel fluorescing material and simple, efficient and economic means for producing it by ways and means well adapted to obtain all the objects and advantages of the invention.

Having described my invention, I claim:

1. A material yielding a yellow fluorescence composed of zinc oxide and vanadium pentoxide, said vanadium pentoxide being between 5 and 41 percent by weight of the mixture.

2. The process of making a material for yielding a yellow fluorescence comprising mixing zinc oxide and vanadium pentoxide and heating to a temperature of substantially 780° C.

3. The process of making a material to yield a yellow fluorescence comprising mixing zinc oxide and vanadium pentoxide in proportions of from 5 to 41 percent by weight vanadium pentoxide of the mixture by weight and heating to a temperature of substantially 780° C.

4. The process of making a material to yield a yellow fluorescence comprising mixing a source of zinc oxide and a source of vanadium oxide in proportions of less than 41 percent vanadium by weight of the mixture and heating to a temperature of substantially 780° C.

5. The process of making a material to yield a yellow fluorescence comprising mixing a source of zinc oxide and a source of vanadium oxide in proportions of between 5 and 41 percent vanadium by weight of the mixture and heating to a temperature of substantially 780° C.

6. The process of making a material to yield a yellow fluorescence comprising mixing a source of zinc oxide and a source of vanadium oxide in proportions of between 5 and 41 percent vanadium by weight of the mixture and heating to a temperature within the range of 600° C. to 900° C.

7. A material resulting from heating a mixture of zinc oxide and a source of vanadium oxide in the proportion of between 5 and 41 percent vanadium by weight, and of mixing and heating to a temperature between 600° C. and 900° C. the resulting material being characterized by a brilliant yellow fluorescence upon radiation with ultra-violet light at wave lengths which will be transmitted by ordinary glass.

8. A material having a yellow fluorescence resulting from heating a mixture of some source of ZnO in the proportions of 60 to 95 parts by weight with some source of $V_2O_5$ in the proportions of 5 to 40 parts by weight, said material having been heated to a temperature in the range between 600° C. and 900° C., which material will fluoresce under ultra-violet radiation at a wave length of approximately 3000 angstrom units.

9. A material having a yellow fluorescence resulting from heating a mixture of oxides of zinc and vanadium to a temperature within the range of 600° C. to 900° C.

10. The process of making a material to yield a yellow fluorescence comprising mixing oxides of zinc and vanadium and heating said oxides to a temperature within the range of 600° C. to 900° C.

WOLDEMAR A. WEYL.